(12) United States Patent
Andersson (10) Patent No.: US 11,828,588 B2
(45) Date of Patent: *Nov. 28, 2023

(54) ADJUSTABLE SQUARE

(71) Applicant: Hultafors Group AB, Bollebygd (SE)

(72) Inventor: Göran Andersson, Borås (SE)

(73) Assignee: HULTAFORS GROUP AB, Bollebygd (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/681,907

(22) Filed: Feb. 28, 2022

(65) Prior Publication Data

US 2022/0282961 A1 Sep. 8, 2022

(30) Foreign Application Priority Data

Mar. 5, 2021 (EP) .................................... 21160979

(51) Int. Cl.
*G01B 3/56* (2006.01)
*B27G 23/00* (2006.01)

(52) U.S. Cl.
CPC ............. *G01B 3/566* (2013.01); *B27G 23/00* (2013.01)

(58) Field of Classification Search
None
See application file for complete search history.

(56) References Cited

U.S. PATENT DOCUMENTS

| 304,196 | A | 8/1884 | Hill |
| 579,023 | A | 3/1897 | Stoy |
| 1,226,172 | A | 5/1917 | Benjamin |
| 1,295,841 | A | 3/1919 | Benjamin |

(Continued)

FOREIGN PATENT DOCUMENTS

| CH | 138040 A | 2/1930 |
| EP | 3832250 A1 | 6/2021 |

(Continued)

OTHER PUBLICATIONS

European Search Report dated Mar. 23, 2020, by the European Patent Office for Application No. 19196420.4. (5 pages).

(Continued)

*Primary Examiner* — Christopher W Fulton
(74) *Attorney, Agent, or Firm* — BUCHANAN, INGERSOLL & ROONEY PC (57) ABSTRACT

A stepwise and stepless adjustable square, including: a stock; a blade; a first alignment structure; a second alignment structure; a spring device; and a knob movable between a first position and a second position, wherein in the first position the first and second alignment structures at certain angles between the stock and the blade align and engage such that a force of the spring device is reduced compared to the force at angles where the first and second alignment structures do not align for stepwise adjustment, and wherein in the second position the second alignment structure is moved axially away from the first alignment structure, whereby the first and second alignment structures are separated from each other, and a first surface associated with the blade is brought into frictional engagement with a second surface associated with the stock for stepless adjustment.

17 Claims, 8 Drawing Sheets

(56) References Cited

U.S. PATENT DOCUMENTS

| | | | | |
|---|---|---|---|---|
| 1,653,993 | A * | 12/1927 | Elsas | G01B 3/56 |
| | | | | 403/97 |
| 1,663,821 | A | 3/1928 | Tuomi | |
| 2,775,037 | A * | 12/1956 | Baumunk | G01B 3/566 |
| | | | | 33/499 |
| 2,837,826 | A | 6/1958 | Cox | |
| 2,942,634 | A | 6/1960 | Gathercoal | |
| 4,267,642 | A | 5/1981 | Stapleford | |
| 4,446,627 | A | 5/1984 | Persson | |
| 4,562,649 | A | 1/1986 | Ciavarella | |
| 4,920,658 | A * | 5/1990 | Hile | G01B 3/566 |
| | | | | 33/499 |
| 5,839,201 | A | 11/1998 | Young | |
| 6,543,144 | B1 | 4/2003 | Morin | |
| 7,047,655 | B2 | 5/2006 | Larsson | |
| 10,532,603 | B2 | 1/2020 | Hummel | |
| 11,609,078 | B2 * | 3/2023 | Andersson | G01B 1/00 |
| 11,624,602 | B2 * | 4/2023 | Andersson | B43L 7/12 |
| | | | | 33/499 |
| 2004/0172841 | A1 | 9/2004 | Larsson | |
| 2011/0138643 | A1 | 6/2011 | Gao | |
| 2019/0225009 | A1 | 7/2019 | Hummel | |
| 2021/0072011 | A1 | 3/2021 | Andersson | |
| 2021/0072012 | A1 | 3/2021 | Andersson | |

FOREIGN PATENT DOCUMENTS

| | | |
|---|---|---|
| GB | 532738 A | 1/1941 |
| GB | 2201251 A | 8/1988 |
| GB | 2396432 A | 6/2004 |
| WO | 0177609 A1 | 10/2001 |

OTHER PUBLICATIONS

European Search Report dated Mar. 18, 2020, by the European Patent Office for Application No. 19196421.2. (8 pages).

European Search Report dated Aug. 27, 2021, issued by the European Patent Office in corresponding European Application No. 21160979.7. (5 pages).

Office Action dated Dec. 23, 2021, issued in the corresponding Canadian Patent Application No. 3,092,537, 4 pages.

Office Action dated Dec. 22, 2021, issued in the corresponding Canadian Patent Application No. 3,092,539, 5 pages.

Communication Pursuant to Article 94(3) EPC dated Sep. 29, 2021, issued in the European Patent Application No. 19196421.2, 3 pages.

* cited by examiner

ADJUSTABLE SQUARE

TECHNICAL FIELD

The present invention relates to a stepwise and stepless adjustable square for use in carpentry.

BACKGROUND ART

A square is generally an instrument having at least one right angle and two straight edges used especially to lay out or test right angles. It may also be referred to a carpenter's square.

A non-adjustable or fixed square has a (longer) blade and a (shorter) stock which meet at a fixed angle of 90 degrees. The whole square could be made of steel, or the blade could be made stainless of steel while the stock is made of plastic, for example. The blade is typically marked with units of length, such as centimetres.

An adjustable square can be set to several positions. GB2396432 A discloses an adjustable square which comprises a blade and a handle, corresponding ends of which pivot about a common pivot axis. Connection means allows for the pivoting movement of the blade and handle about the pivot axis. The pivoting movement is limited by an indexing mechanism comprising of first and second matching profiled plates, the first plate has a series of radial ridges and the second plate has a corresponding series of radial grooves, the engagement of which results in the square being locked at a specific angle. The plates are biased into engagement with each other by a spring member which augments the locking action when a ridge of the first plate engages with a groove of the second plate. The spring is held in compression by the connection means.

Another type of square is the bevel square, wherein the blade pivots and can be locked at any angle relative to the stock, typically by loosening or tightening a screw.

SUMMARY OF THE INVENTION

It would be desirable to have an adjustable square which can be set to several positions, as for example in GB2396432 A, as well as to any angle, like a bevel square. It is therefore an object of the present invention to provide a technical solution to achieve such functionality.

According to an aspect of the invention, this and other objects are achieved by a stepwise and stepless adjustable square for use in carpentry, comprising: a stock; a blade rotatable relative to the stock around an axis of rotation; a first alignment structure adapted to rotate rigidly with the stock around the axis of rotation; a second alignment structure complementary to the first alignment structure and adapted to rotate rigidly with the blade around the axis of rotation; a spring device for axially pressing the second alignment structure towards the first alignment structure; and a knob movable between a first position and a second position, wherein in the first position the first alignment structure and the second alignment structure at certain angles between the stock and the blade align and engage such that a force of the spring device is reduced compared to the force at angles where the first and second alignment structures do not align for stepwise adjustment, and wherein in the second position the second alignment structure is moved axially away from the first alignment structure, whereby the first and second alignment structures are separated from each other, and a first surface associated with the blade is brought into frictional engagement with a second surface associated with the stock for stepless adjustment.

The stock could also be referred to as a tongue. When the knob is in the first position, the adjustable square can be set to several distinct positions (e.g. 22.5 or 45 degrees steps). When the knob is in the second position, the adjustable square can be set to any angle (stepless).

The present invention is based on the understanding that stepless setting of the blade angle conveniently can be added to a stepwise adjustable square by providing a (manually operable) knob, the operation of which both separates the first and second alignment structures and at the same time brings surfaces associated with the blade and stock, respectively, into frictional engagement, whereby inert stepless movement of the blade relative to the stock may be achieved as an alternative mode to the stepwise adjustment. Furthermore, the present square which allows for both stepwise and stepless adjustment of the blade relative to the stock may be highly versatile. For example, the square can at one instance be used for building where fixed angles are used, such as setting up studs that are perpendicular to floor joists, and at another instance be used to transfer an arbitrary angle of e.g. a roof pitch to a workpiece.

Preferably, the knob is operatively connected to a displacement element, wherein in the second position of the knob the displacement element directly or indirectly pushes the blade such that the second alignment structure is moved axially away from the first alignment structure and such that the first surface is brought into the frictional engagement with the second surface. This embodiment with the displacement element may be relatively easy to manufacture/assemble. That the knob is operatively connected to the displacement element may be construed as operation of the knob affects the displacement element, e.g. causes rotational or axial movement of the displacement element. That the displacement element directly pushes the blade can mean that the displacement element is in contact with the blade for pushing it. That the displacement element indirectly pushes the blade can mean that the displacement element pushes some intermediate element which in turn pushes the blade.

The stock may have first and second parallel stock portions. The blade may be partly provided in a space between the first and second parallel stock portions. The spring device may be arranged between the first stock portion and the blade. The displacement element may be arranged between the second stock portion and the blade. Hence, the spring device and displacement element may be positioned on opposite sides of the blade.

The displacement element may be positioned radially inside at least one of the first and second alignment structures. In this way, the height can be kept low, which in turn makes the square easy to carry. The second alignment structure associated with the blade may for example have an overall ring shape, whereas the displacement element may be positioned in the ring and be disc- or ring-shaped, for example.

In one or more embodiments, the knob is movable between the first position and the second position by rotation about the axis of rotation, wherein the displacement element comprises at least one wedge causing the displacement element to push the blade as the displacement element is rotated about the axis of rotation along with the knob. A height of the at least one wedge may taper in an arcuate direction of the displacement element. The at least one wedge may conveniently be used to convert rotary motion to axial/linear motion.

The at least one wedge of the displacement element may cooperate with at least one corresponding element/wedge associated with the stock. The at least one corresponding element/wedge may for example be positioned at the second stock portion, radially inside the first alignment structure.

The knob may comprise a lever pivotable in a plane parallel and proximal to a surface extending between first and second longitudinal edges of the stock. This allows the knob to be readily manipulated by a user, and it may also contribute to keeping the height of the adjustment mechanism low.

The first and second alignment structures may each comprise radial ridges and valleys, both with inclined sides. At least partly due to the inclined sides, the user can adjust the square both stepwise and stepless by only maneuvering the blade and stock, without necessarily having to somehow operate the knob at the same time.

The first surface associated with the blade may be an elevated circumferential flat surface on the opposite side of the blade compared to the second alignment structure, wherein the second surface associated with the stock is a flat surface of the stock surrounding said spring device. The elevated circumferential flat surface could be integrated with the blade or on a separate element mounted to the blade. The second surface may be (on) the inside surface of the first stock portion facing the blade. Alternatively or complementary to the elevated first surface, the second surface may be elevated.

The friction torque of the frictional engagement when the knob is in the second position may be in the range of 0.3-3 Nm. This may give the stepless movement of the blade relative to the stock a suitable inertia. Furthermore, the square could have two second positions, one with looser stepless movement and one with more inert stepless movement.

The knob may further be moveable to a third position where the blade is locked relative to the stock. In the third position, the friction torque of the frictional engagement of the first surface associated with the blade and the second surface associated with the stock may for example be >3 Nm.

The blade may be rotatable (approximately) 270 degrees relative to the stock around the axis of rotation between a first extreme position at zero degrees, where the blade is parallel to the stock and partly provided in a space of the stock, and a second extreme position at about 270 degrees, where the blade is substantially perpendicular to the stock. Being able to move the blade up to (about) 270 degrees greatly enhances the usability of the adjustable square.

The stock may have first and second longitudinal edges, wherein the space has a first slot that extends along the complete first longitudinal edge for receiving the blade in the first extreme position, wherein the space has a second slot that extends along only a portion of the second longitudinal edge for receiving the blade in the second extreme position, and wherein the remainder of the second longitudinal edge does not have a slot. This is useful in case one uses the adjustable square with the blade at 270 degrees and works with thin items such as sheet metal which can rest against the slot-less remainder of the second longitudinal edge. If the second slot would extend along the complete second longitudinal edge, the sheet metal could easily enter into such a slot. The first longitudinal edge preferably extends along the complete length of the stock. The second longitudinal edge preferably extends along the complete length of the stock. In other words, the first and second longitudinal edges may extend all along the stock.

The blade when positioned at 90 degrees can have an exposed short edge portion aligned with the second longitudinal edge of the stock and forming a right corner with the upper edge of the blade. This means that the adjustable square can have an "clean" perpendicular exterior contour similar to many non-adjustable or fixed squares, which may be useful for many types of measurements.

The heel of the adjustable square when the blade is in the second extreme position at about 270 degrees may be at least partly rounded. This allows the present square to properly bear against surfaces arranged at 90-180 deg angle without the (at least partly rounded) heel interfering, which in turn means that one readily can copy or transfer an obtuse angle. To achieve the at least partly rounded heel, both the blade and the stock could have an at least partly rounded corner.

The blade may be made of stainless steel and/or be marked with units of length. The blade may for example have millimetre graduations.

In another embodiment, the knob is movable between the first position and second position by rotation about the axis of rotation, wherein the knob is operatively connected to a part rotatably arranged in an opening or recess in the stock, and wherein said part comprises at least one wedge cooperating with at least one corresponding wedge of an intermediate displacement element causing the intermediate displacement element to push the blade as said part is rotated about the axis of rotation along with the knob to the second position such that the second alignment structure is moved axially away from the first alignment structure and such that the first surface is brought into frictional engagement with the second surface.

In yet another embodiment, the knob is movable between the first position and the second position by rotation about the axis of rotation, wherein the displacement element comprises at least one internal thread cooperating with at least one external thread associated with the knob causing the displacement element to move axially and to push the blade as the knob is rotated about the axis of rotation.

BRIEF DESCRIPTION OF THE DRAWINGS

This and other aspects of the present invention will now be described in more detail, with reference to the appended drawings showing one or more embodiments of the invention.

FIGS. 2a-b are partial cross-sectional side views of the adjustable square as shown in FIGS. 1a-b, wherein FIG. 2b is off centre with respect to the axis of rotation.

FIG. 6b is a perspective view of a detail of the embodiment in FIG. 6a.

DETAILED DESCRIPTION

Figure 1A:
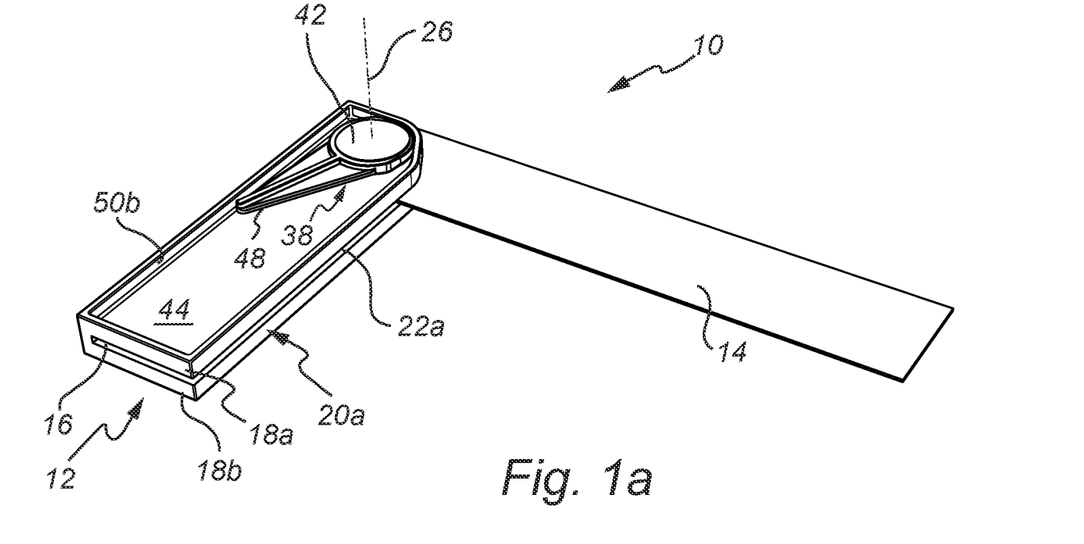
FIGS. 1a-b are perspective views of an adjustable square according to an embodiment of the present invention.
Figure 1B:
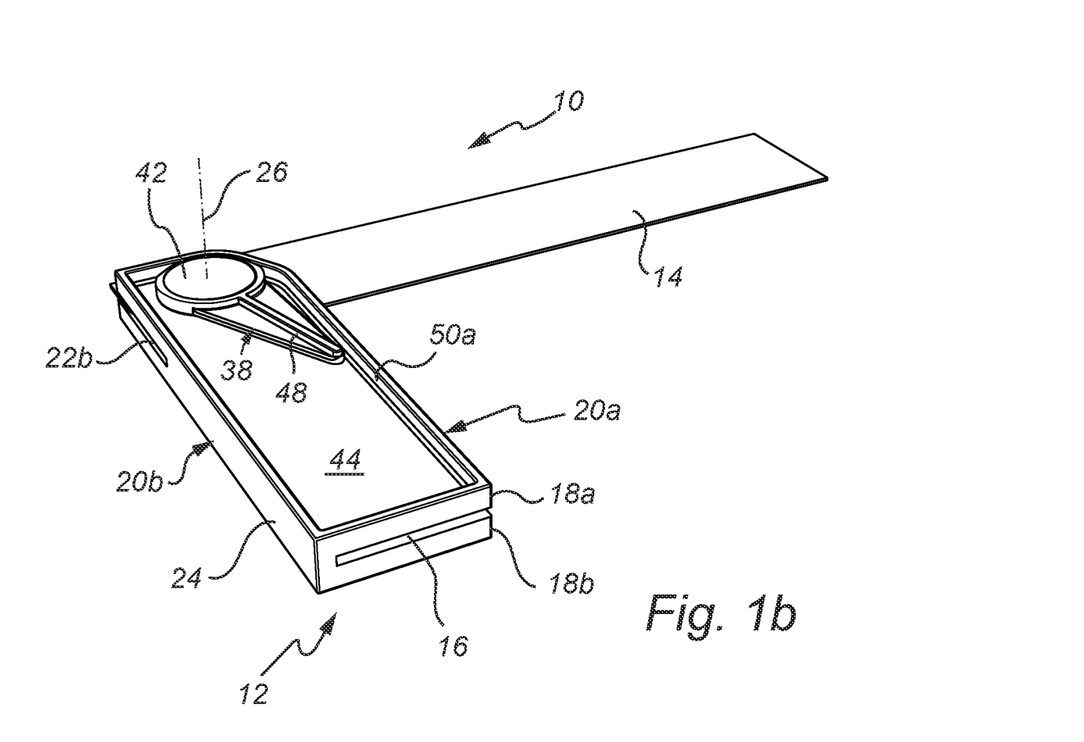

FIGS. 1a-b are perspective views of a stepwise and stepless adjustable square 10 (hereinafter referred to simply as "square") according to an embodiment of the present invention.

The square 10 comprises a stock 12 and a blade 14.

Figure 4A:
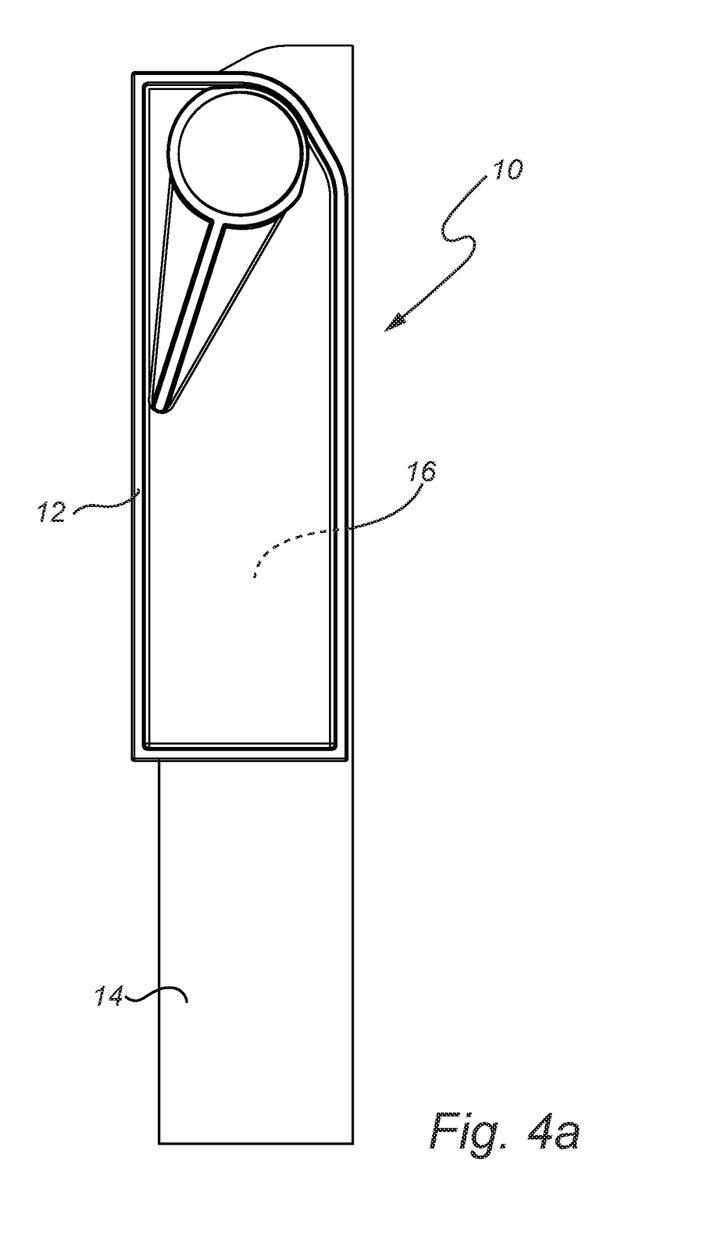
FIGS. 4a-d show the adjustable square according to one or more embodiments of the present invention with the blade at 0 degrees, 270 degrees, 90 degrees, and 225 degrees, respectively.

The stock 12 may comprise a (n internal) space 16 between first and second parallel stock portions 18a-b, in which space 16 the blade 14 may be partly provided (see for example FIG. 4a). The stock 12 may further have first and second longitudinal edges 20a-b, wherein a first slot 22a to the space 16 extends along the complete first longitudinal edge 20a, and wherein a second slot 22b to the space 16 extends along only a portion of the second longitudinal edge 20b while the remainder 24 of the second longitudinal edge 20b does not have any slot. The stock 12 could be made of (anodised) aluminium or magnesium or plastic, for example.

The blade 14 blade is rotatable relative to the stock 12 around an axis of rotation 26. The blade 14 has a generally rectangular shape and can be marked with units of length, such as millimetre graduations. The blade 14 can for example be made of stainless steel.

Figure 2A:
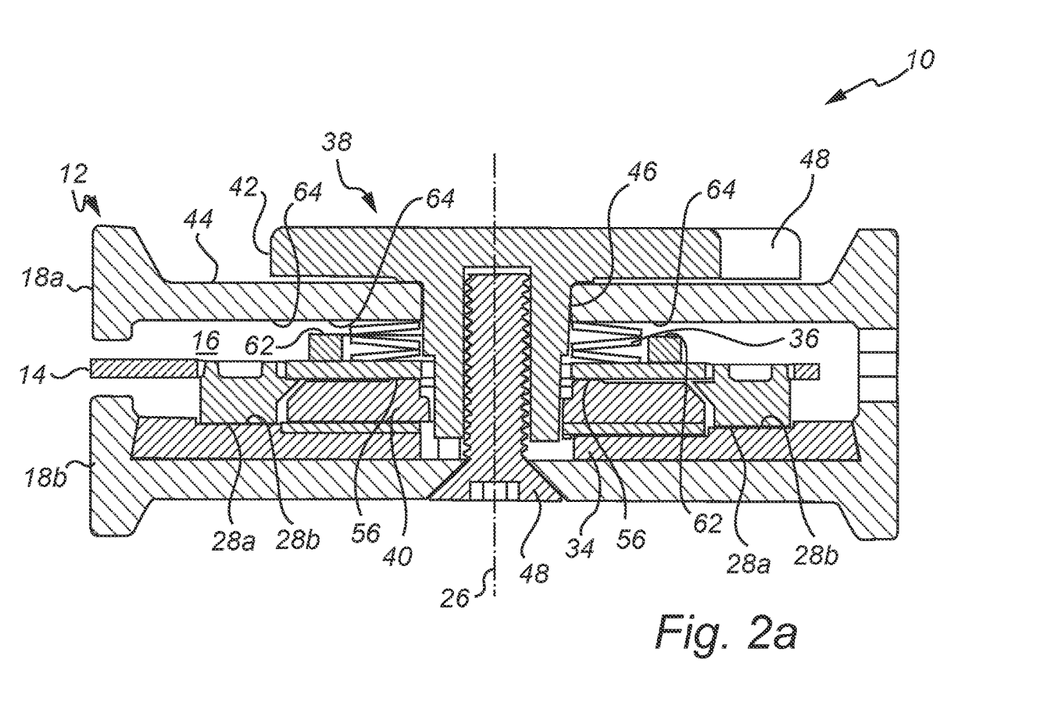
Figure 2B:
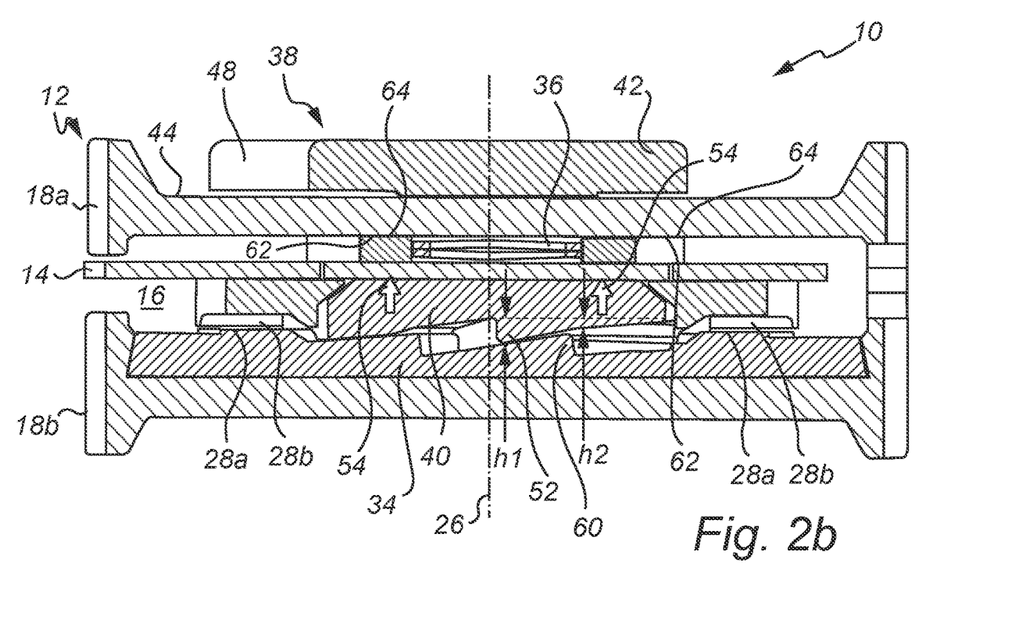
Figure 3A:
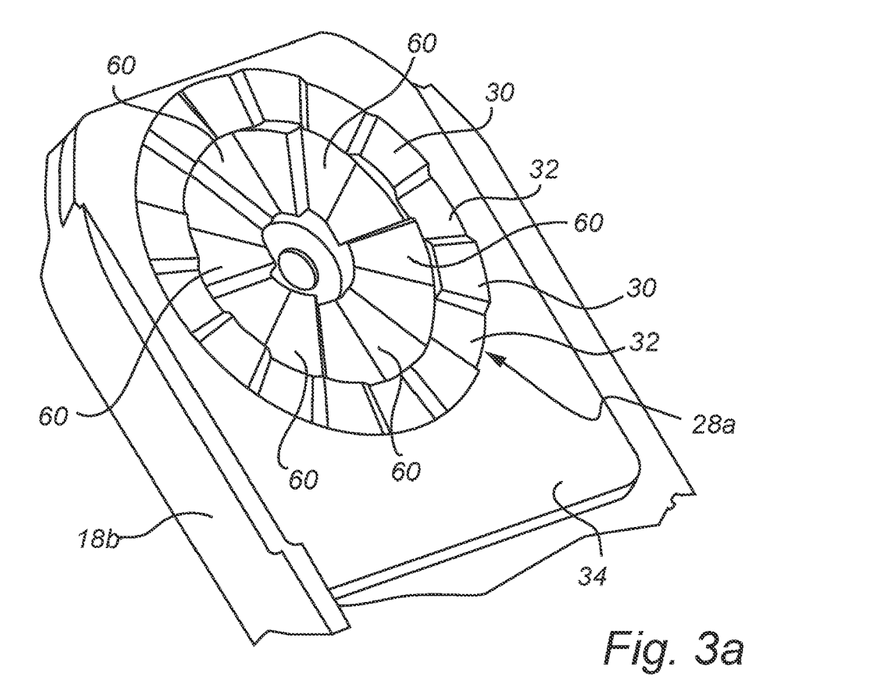
FIG. 3a is a perspective view the first alignment structure and corresponding wedges.
Figure 3B:
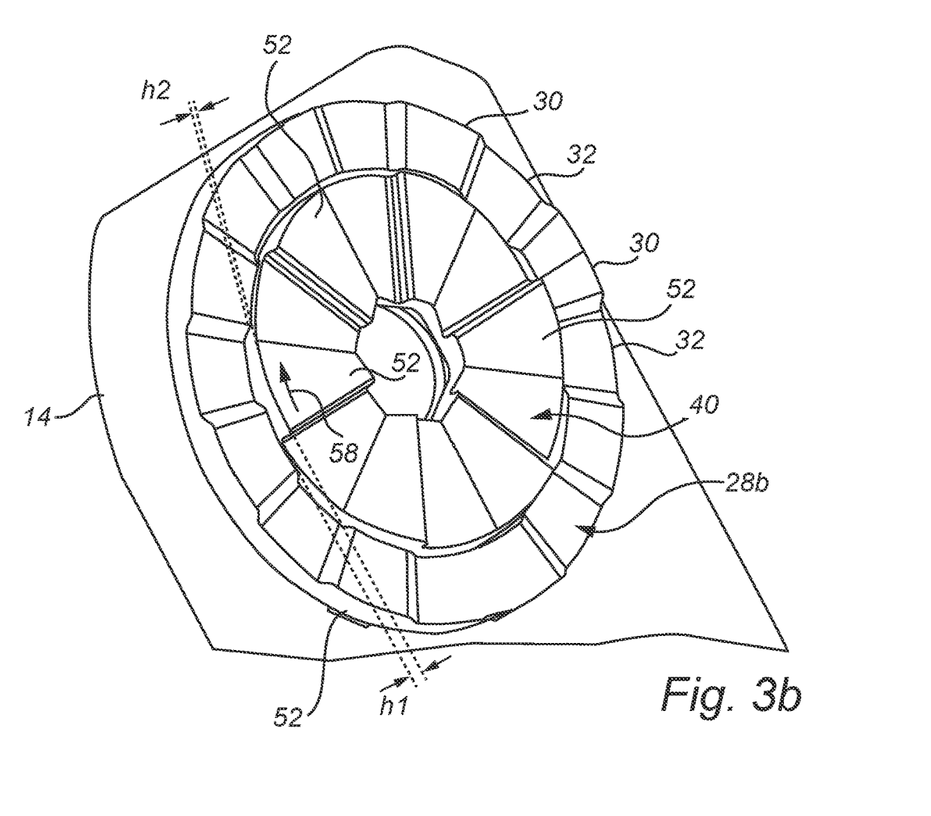
FIG. 3b is a perspective view the second alignment structure and wedges of the displacement element.

With further reference to FIGS. 2a-b and 3a-b, the square 10 further comprises a first alignment structure 28a adapted to rotate rigidly with the stock 12 around the axis of rotation 26, and a second alignment structure 28b complementary to the first alignment structure 28a and adapted to rotate rigidly with the blade 14 around the axis of rotation 26. The first and second alignment structures 28a-b may each comprise a (ring-shaped) surface with radial ridges 30 and valleys 32, similar to a crown gear. Typically, a radial ridge 30 of the first alignment structure 28a fits or matches a radial valley 32 of the second alignment structure 28b, and so on. The radial ridges 30 and valleys 32 should have inclined sides, as shown in FIGS. 3a-b.

The first alignment structure 28a faces the blade 14. The first alignment structure 28a may be formed in an element 34 firmly attached to the second stock portion 18b. Alternatively, the first alignment structure 28a could be integrated with the second stock portion 18b The second alignment structure 28b faces the second stock portion 18b. The second alignment structure 28b may be firmly attached to, or integrated with, the blade 14, in order to rotate rigidly with the blade 14.

The square 10 further comprises a spring device 36 for axially pressing the second alignment structure 28b towards the first alignment structure 28a. The spring device 36 may for example be dual conical spring washers. The spring device 36 may be coaxial with the axis of rotation 26. The spring device 36 may be arranged between and in contact with the first stock portion 18a and the blade 14.

The square 10 further comprises a knob 38. The knob 38 is operatively connected to a displacement element 40. The displacement element 40 is arranged between the second stock portion 18b and the blade 14, namely between element 34 and blade 14. The displacement element 40 will be further discussed hereinbelow.

The knob 38 is movable between a first position (FIGS. 1a and 2a) and a second position (FIGS. 1b and 2b), here by rotation around the axis of rotation 26. Specifically, the knob 38 may comprise a disc 42 arranged on or over an outer surface 44 of the first stock portion 18a. The outer surface 44 extends between the first and second longitudinal edges 20a-b of the stock 12. The knob 38 may further comprise a column 46 coaxial with the axis of rotation 26. The column 46 extends from the disc 42, through an opening in each of the first stock portion 18a, the spring device 36, and the blade 14, to the displacement element 40. The column 46 is rigidly connected to the displacement element 40, such that rotation of the knob 38 about the axis 26 causes rotation of the displacement element 40 about the axis 26. A screw or bolt 47 may extend through the second stock portion 18b and attach to the interior of the column 46.

The knob 38 may further comprise a lever 48. The lever 48 may extend from the disc 42. The lever 48 is pivotable in a plane parallel and proximal to the surface 44. The lever 48 is intended to be operated by a user of the square 10, conveniently by the thumb while holding the stock 12 with the same hand. The rotation of the knob 38 may be limited by the lever 48 abutting first and second insides 50a-b of the first and second longitudinal edges 20a-b. The knob 38 may be in the afore-mentioned first position when the lever 48 abuts the second inside 50b (FIG. 1a), and the knob 38 may be in the second position when the lever 48 abuts the first inside 50a (FIG. 1b). Apart from the first inside 50a, due to friction, no further means may be needed to allow the knob 38 to stay in the second position without a user having to hold the knob 38 in the second position (to prevent it from going back to the first position by itself).

The displacement element 40 may be positioned radially inside the second alignment structure 28b associated with the blade 14. The displacement 40 element may for example be positioned inside the ring formed by the (ring-shaped) surface with radial ridges 30 and valleys 32 of the second alignment structure 28b, as shown for example in FIG. 3b.

Furthermore, the displacement element 40 comprises a plurality of wedges 52. The wedges 52 may cause the displacement element 40 to push the blade 14 towards the first stock portion 18a (indicated by arrows 54 in FIG. 2b) when the knob 38 and displacement element 40 are rotated about the axis 26. The wedges 52 may be provided in a surface of the displacement element 40 facing the element 34/second stock portion 18b. Opposite the wedges 52, the displacement element 40 has a surface 56 contacting the blade 14.

The wedges 52 may be voussoir shaped (top view), but also have a height that tapers in an arcuate direction 58, for example from h1 to h2 in FIG. 3b, wherein h1>h2 (h2 may eventually be zero). In other words, the height of each wedge 52 increases in the counter-clockwise direction as shown in FIG. 3b. By turning the knob 38 in the counter-clockwise direction (from the first position to the second position), the displacement element 40 pushes the blade 14 such that the second alignment structure 28b is moved axially away from the first alignment structure 28a, and by turning the knob 38 in the clockwise direction (from the second position to the first position), the second alignment structure 28b can be moved axially towards the first alignment structure 28a.

The wedges 52 of the displacement element 40 may cooperate with corresponding wedges 60 associated with the stock 12. The corresponding wedges 60 may for example be formed in element 34 firmly attached to the second stock portion 18b. Furthermore, the corresponding wedges 60 may be positioned inside the ring formed by the (ring-shaped) surface with radial ridges 30 and valleys 32 of the first alignment structure 28a, as shown for example in FIG. 3a.

The square 10 further comprises a first (friction) surface 62 associated with the blade 14 and a second (friction) surface 64 associated with the stock 12. Specifically, the first surface 62 may be an elevated circumferential (ring-shaped) flat surface on the opposite side of the blade 14 compared to the second alignment structure 28b, i.e. on the side of the blade 14 facing the first stock portion 18a. The elevated circumferential flat surface 62 may be radially outside the spring device 38. The second surface 64 may be a flat surface. The second surface 64 may surround the spring device 38. The second surface 64 may be (on) the inside surface of the first stock portion 18a facing the blade 14.

In the first position of the knob 38, corresponding to stepwise adjustment of the square 10, the first alignment structure 28a and the second alignment structure 28b at certain angles between the stock 12 and the blade 14 align and engage such that a force of the spring device 36 is reduced compared to the force at angles where the first and second alignment structures 28a-b do not align. Namely, when the ridges 30 of the first alignment structure 28a are received in the valleys 32 of the second alignment structure 28b and vice versa, the force of the spring device 36 is lower than when the ridges 30 of the first alignment structure 28a and the ridges 30 of the second alignment structure 28b are abutting each other. Hence in the first position of the knob 38, the square 10 can be set to several distinct positions (e.g. 22.5 or 45 degrees steps) corresponding to said certain angles. It is appreciated that when the user here rotates the blade 14 relative to the stock 12, the user will feel when the blade 14 snaps into one of those distinct position. By exerting some greater rotational force (to get the ridges 30 out of the valleys 32), the user can easily move the blade 14 to the next distinct position. Also in the first position of the knob 38, there is a gap between the first and second (friction) surfaces 62, 64, see FIG. 2a.

However, in the second position of the knob 38, corresponding to stepless adjustment of the square 10, the displacement element 40 pushes the blade 14 such the second alignment structure 28b of the blade 14 is moved axially away from the first alignment structure 28a, whereby the first and second alignment structures 28a-b are separated from each other (FIG. 2b), and such that the aforementioned first surface 62 is brought into frictional engagement with the second surface 64 (also FIG. 2b). Hence in the second position of the knob 38, the square 10 can be set to any angle. The stock 12 could have markings (e.g. one marking per degree, say from 0-90°) aligning with (the lower edge of) the blade 14 to indicate the current position/angle of the blade 14. It is appreciated that when the user here rotates the blade 14 relative to the stock 12, the user will not feel the afore-mentioned distinct position. The friction torque of the frictional engagement when the knob 38 is in the second position may be in the range of 0.3-3 Nm, to give the stepless movement of the blade 14 relative to the stock 12 a suitable inertia. That is, the rotational force needed to be applied by the user to move the blade 14 must be greater than 0.3-3 Nm, to overcome the torque caused by the frictional force that occurs when the first and second surfaces 62 and 64 in contact move.

In another embodiment, the knob 38 could have a third position, wherein the displacement element 40 further pushes the blade 14 so much that the first and second frictional surfaces 62, 64 basically lock the blade 14 relative to the stock 12. The friction torque of the frictional engagement in the third position may be >3 Nm, for example approximately 10 Nm. In this embodiment, in the first position of the knob 38 (=stepwise adjustment), the lever 48 may point to and possibly abut the second inside 50b, in the second position of the knob 38 (=stepless adjustment), the lever 48 may be positioned (e.g. midway) between the first and second insides 50a-b, and in the third position of the knob 38 (=blade locked), the lever 48 may point to and possibly abut the first inside 50a.

The present square 10 which allows for both stepwise and stepless adjustment of the blade 14 relative to the stock 12 may be highly versatile. For example, the square 10 can at one instance be used for building where fixed angles are used, such as setting up suds that are perpendicular to floor joists, and at another instance be used to transfer an arbitrary angle of e.g. a roof pitch to a workpiece. Furthermore, the square 10 with the displacement element 40 may be relatively easy to manufacture/assemble.

Figure 5A:
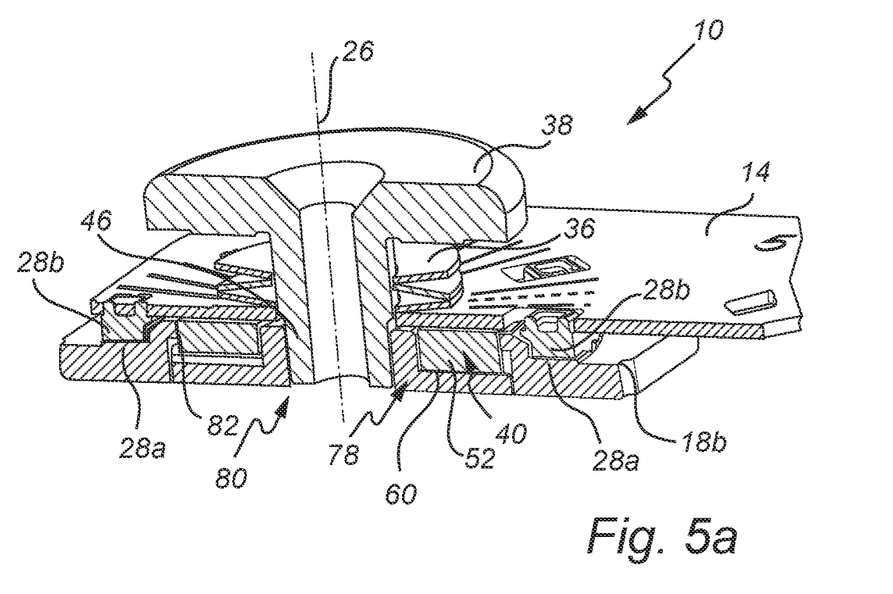
FIGS. 5a-b show of details of an adjustable square according to another embodiment of the present invention.
Figure 5B:
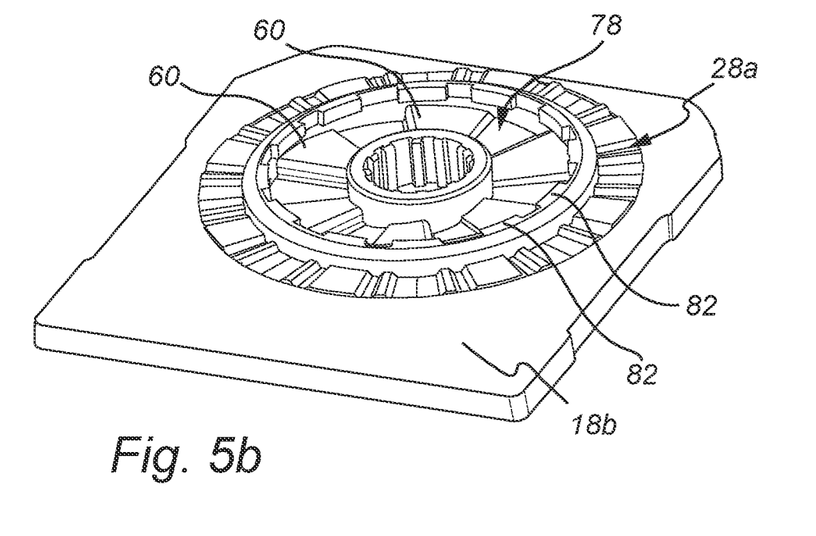

In another embodiment illustrated in FIGS. 5a-b, the wedges 60 may be formed in a wheel-like part 78 rotatably arranged in an opening (or recess) 80 in the second stock portion 18b, which part 78 is operatively connected to the knob 38. Specifically, part 78 may be connected to column 46, such that rotation of the knob 38 about the axis 26 causes rotation of the part 78 about the axis 26. The wedges 60 cooperate with the corresponding wedges 52 of the displacement element 40. Here, the knob 38 is not operatively connected to rotate the displacement element 40. The displacement element 40 is here prevented from rotating, for example by splines 82 at its circumference. When the knob 38 is rotated from the first position to the second position, part 78 rotates about the axis 26 and the wedges 52, 60 cause the displacement element 40 to move axially and push the blade 14 such the second alignment structure 28b of the blade 14 is moved axially away from the first alignment structure 28a, whereby the first and second alignment structures 28a-b are separated from each other, and such that the aforementioned first surface 62 is brought into frictional engagement with the second surface 64 (as in FIG. 2b). In this embodiment, if a user tries to move the blade 14 in the locked mode, the knob 38 may be prevented from accidentally departing from the aforementioned third position, because the displacement element 40 cannot rotate. Hence, the force in the third position/locked mode may be maintained.

It should be noted that in the embodiment illustrated in FIGS. 5a-b, part 78 (with wedges 60) could be regarded as a displacement element operatively connected to the knob 38, wherein in the second position of the knob 38 the displacement element 78 indirectly (that is, via intermediate element 40) pushes the blade 12 such that the second alignment structure 28b is moved axially away from the first alignment structure 28a and such that the first surface 62 is brought into frictional engagement with the second surface 64.

Figure 6A:
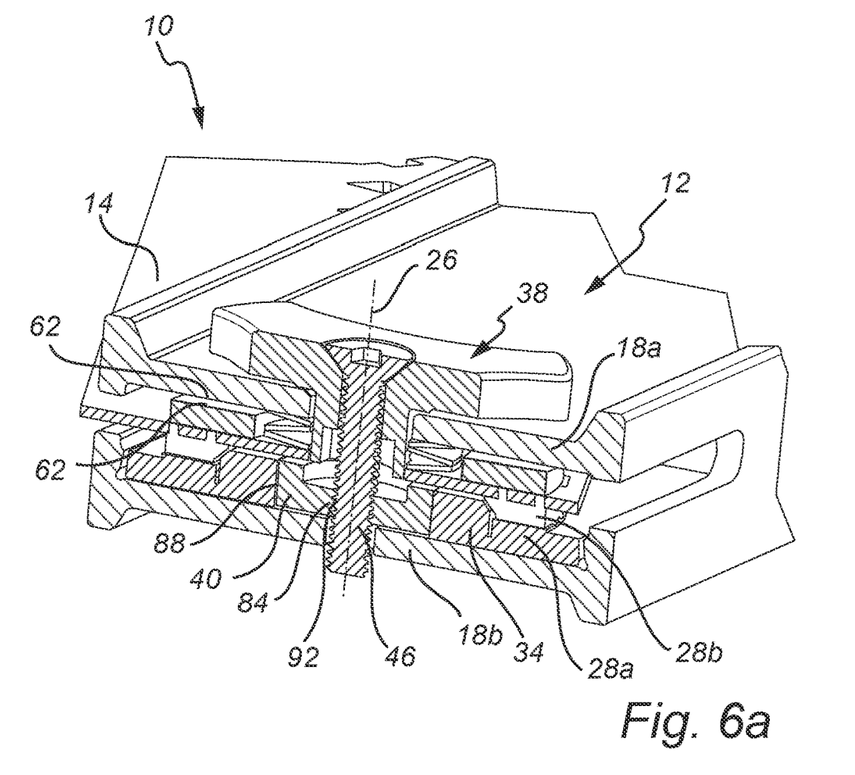
FIG. 6a is a cross sectional perspective view of an adjustable square according to yet another embodiment of the present invention.
Figure 6B:
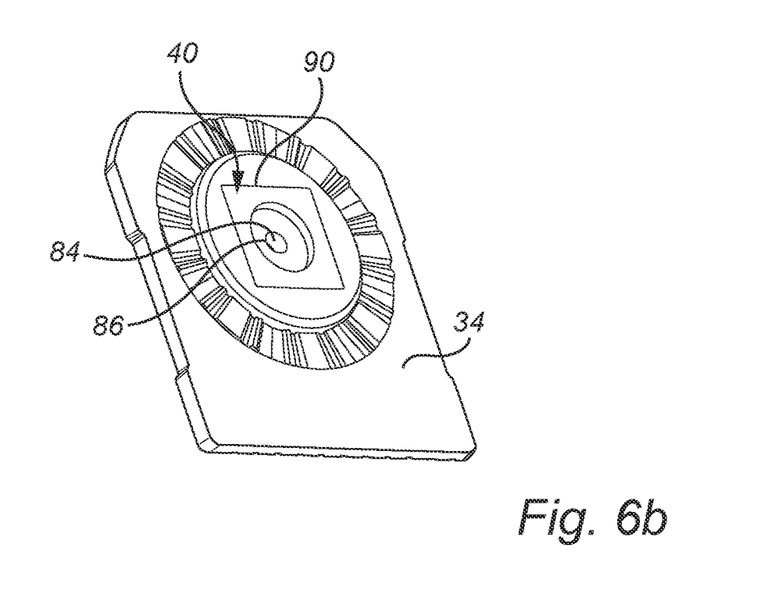

In yet another embodiment illustrated in FIGS. 6a-b, the displacement element 40 comprises least one internal thread 84 provided in a through hole 86 of the displacement element 40. The displacement element 40 is here prevented from rotating. To this end, this displacement element 40 may be at least partly arranged in an opening (or recess) 88 in element 34 or in the second stock portion 18b, which opening (or recess) 88 matches the perimeter 90 of the displacement element 40. In FIG. 6b, the perimeter 90 is square, but it could have other shapes. As such, this displacement element 40 may be (regarded as) a nut. The least one internal thread 84 cooperates with at least one corresponding external thread 92 associated with the knob 38. The at least one external thread 92 could for example be provided on column 46, in FIG. 6a exemplarily embodiment as a screw or bolt. Hence, the knob 38 is here operatively connected to the displacement element 40 such that rotation of the knob 38 (about axis 26) causes axial movement of the displacement element 40 (along axis 26). Specifically, when the knob 38 is rotated from the first position to the second position, threads 90, 92 together with the matching opening (or recess) 88 preventing rotation of the displacement element 40 cause the displacement element 40 to move axially towards the blade 14 and push the blade 14 such the second alignment structure 28b of the blade 14 is moved axially away from the first alignment structure 28a, whereby the first and second alignment structures 28a-b are separated from each other, and such that the aforementioned first surface 62 is brought into frictional engagement with the second surface 64 (as in FIG. 2b). That is, the blade 14 gets clamped or squeezed between the displacement element/nut 40 and the first stock portion 18a with the elevated first surface 62 in between.

Figure 4B:
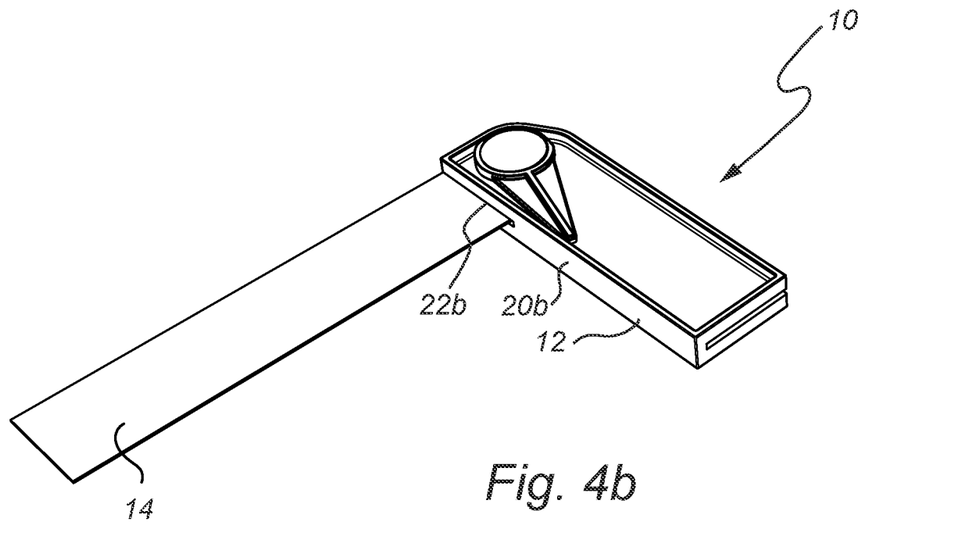

Turning to FIGS. 4a-b, the blade 14 of the square 10 is preferably rotatable relative to the stock 12 around the axis of rotation 26 between a first extreme position at zero degrees where the blade 14 is parallel to the stock 12 and partly provided in the aforementioned space 16 of the stock 12 (FIG. 4a), and a second extreme position at about 270 degrees where the blade 14 is substantially perpendicular to the stock 12 (FIG. 4b). In the second extreme position, the blade 14 is received in the second slot 22b of the second longitudinal edge 20b of the stock 12. With 22.5 degrees steps, this results in twelve distinct positions. With 45 degrees steps, the square 10 could have six distinct blade positions (apart from the position at zero degrees when the blade 14 is in the stock 12).

Figure 4C:
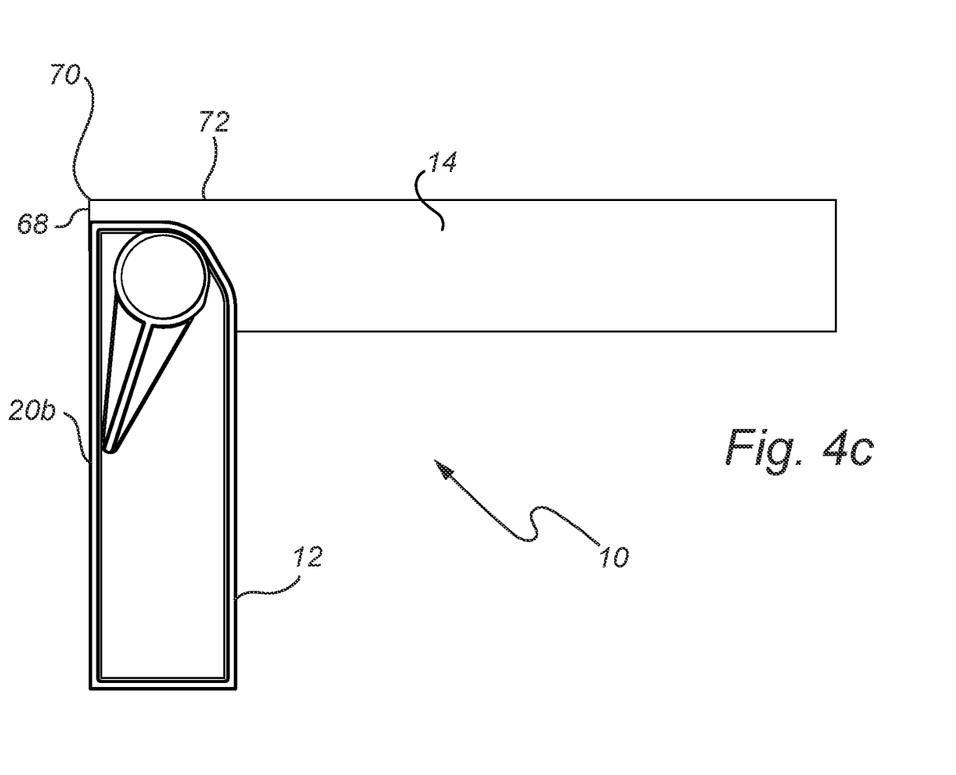

As seen when positioned at 90 degrees (FIG. 4c), the blade 14 can have an exposed short edge portion 68 aligned with the second longitudinal edge 20b of the stock 14 and forming a right corner 70 with the upper edge 72 of the blade 12. This means that the square 10 can have an "clean" or continuous perpendicular exterior contour, as seen in FIG. 4c.

Figure 4D:
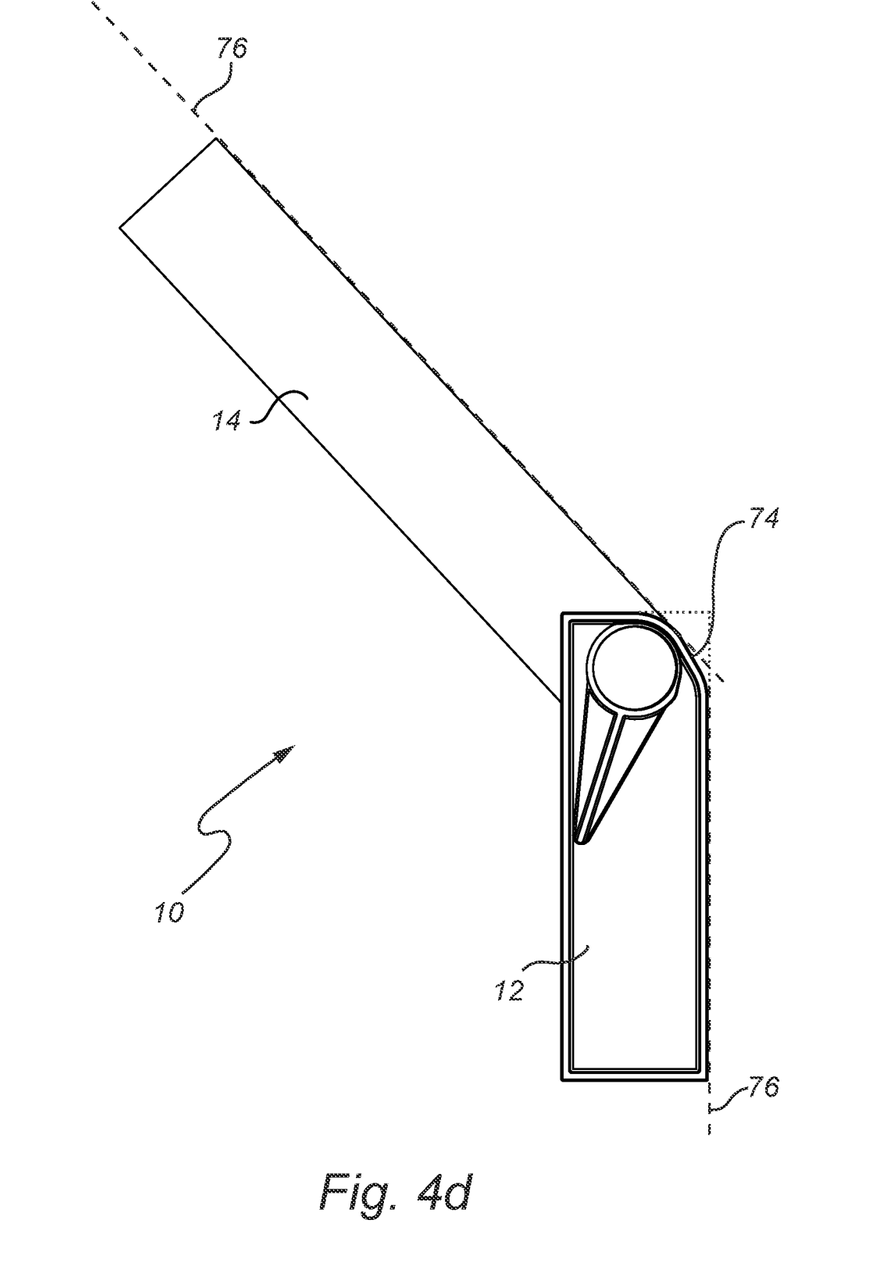

Finally in FIG. 4d, the so-called heel 74 of the square 10 (as seen when the blade 14 is in the second extreme position at about 270 degrees) is at least partly rounded. This allows the square 10 to properly bear against surfaces 76 arranged at 90-180 deg angle without the heel 74 interfering. This is readily appreciated when considering the dotted non-rounded heel also shown in FIG. 4d just for comparison purposes. To achieve the at least partly rounded heel 74, both the blade 14 and the stock 12 may have an at least partly rounded corner.

The person skilled in the art realizes that the present invention by no means is limited to the preferred embodiments described above. On the contrary, many modifications and variations are possible within the scope of the appended claims.

The invention claimed is:

1. A stepwise and stepless adjustable square for use in carpentry, comprising:
   a stock;
   a blade rotatable relative to the stock around an axis of rotation;
   a first alignment structure adapted to rotate rigidly with the stock around the axis of rotation;
   a second alignment structure complementary to the first alignment structure and adapted to rotate rigidly with the blade around the axis of rotation;
   a spring device for axially pressing the second alignment structure towards the first alignment structure; and
   a knob movable between a first position and a second position,
   wherein in the first position the first alignment structure and the second alignment structure at certain angles between the stock and the blade align and engage such that a force of the spring device is reduced compared to the force at angles where the first and second alignment structures do not align for stepwise adjustment, and
   wherein in the second position the second alignment structure is moved axially away from the first alignment structure, whereby the first and second alignment structures are separated from each other, and a first surface associated with the blade is brought into frictional engagement with a second surface associated with the stock for stepless adjustment.

2. A square according to claim 1, wherein the knob is operatively connected to a displacement element, and wherein in the second position of the knob the displacement element directly or indirectly pushes the blade such that the second alignment structure is moved axially away from the first alignment structure and such that the first surface is brought into frictional engagement with the second surface.

3. A square according to claim 2, wherein the stock has first and second parallel stock portions, wherein the blade may be partly provided in a space between the first and second parallel stock portions, wherein the spring device is arranged between the first stock portion and the blade, and wherein the displacement element is arranged between the second stock portion and the blade.

4. A square according to claim 2, wherein the displacement element is positioned radially inside at least one of the first and second alignment structures.

5. A square according to claim 2, wherein the knob is movable between the first position and the second position by rotation about the axis of rotation, and wherein the displacement element comprises at least one wedge causing the displacement element to push the blade as the displacement element is rotated about the axis of rotation along with the knob.

6. A square according to claim 5, wherein a height of the at least one wedge tapers in an arcuate direction of the displacement element.

7. A square according to claim 5, wherein the at least one wedge of the displacement element cooperates with at least one corresponding element or wedge associated with the stock.

8. A square according to claim 5, wherein the knob comprises a lever pivotable in a plane parallel and proximal to a surface extending between first and second longitudinal edges of the stock.

9. A square according to claim 2, wherein the knob is movable between the first position and the second position by rotation about the axis of rotation, and wherein the displacement element comprises at least one internal thread cooperating with at least one external thread associated with the knob causing the displacement element to move axially and to push the blade as the knob is rotated about the axis of rotation.

10. A square according to claim 1, wherein the first and second alignment structures each comprises radial ridges and valleys, both with inclined sides.

11. A square according to claim 1, wherein the first surface associated with the blade is an elevated circumferential flat surface on the opposite side of the blade compared to the second alignment structure, and wherein the second surface associated with the stock is a flat surface of the stock surrounding said spring device.

12. A square according to claim 1, wherein the friction torque of the frictional engagement when the knob is in the second position is in the range of 0.3-3 Nm.

13. A square according to claim 1, wherein the knob further is movable to a third position where the blade is locked relative to the stock.

14. A square according to claim 1, wherein the blade is rotatable approximately 270 degrees relative to the stock around the axis of rotation between a first extreme position at zero degrees, where the blade is parallel to the stock and partly provided in a space of the stock, and a second extreme position at about 270 degrees, where the blade is substantially perpendicular to the stock.

15. A square according to claim 14, wherein stock has first and second longitudinal edges, wherein the space has a first slot that extends along the complete first longitudinal edge for receiving the blade in the first extreme position, wherein the space has a second slot that extends along only a portion of the second longitudinal edge for receiving the blade in the second extreme position, and wherein the remainder of the second longitudinal edge does not have a slot.

16. A square according to claim 14, wherein the heel of the adjustable square when the blade is in the second extreme position at about 270 degrees is at least partly rounded.

17. A square according to claim 1, wherein the knob is movable between the first position and second position by rotation about the axis of rotation, wherein the knob is operatively connected to a part rotatably arranged in an opening or recess in the stock, and wherein said part comprises at least one wedge cooperating with at least one corresponding wedge of an intermediate displacement element causing the intermediate displacement element to push the blade as said part is rotated about the axis of rotation along with the knob to the second position such that the second alignment structure is moved axially away from the first alignment structure and such that the first surface is brought into frictional engagement with the second surface.

\* \* \* \* \*